United States Patent
Patel et al.

(10) Patent No.: US 7,496,057 B2
(45) Date of Patent: Feb. 24, 2009

(54) METHODS AND APPARATUS FOR OPTIMIZATIONS IN 3GPP2 NETWORKS USING MOBILE IPV6

(75) Inventors: Alpesh Patel, Pleasanton, CA (US); Kent Leung, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 257 days.

(21) Appl. No.: 11/201,872

(22) Filed: Aug. 10, 2005

(65) Prior Publication Data
US 2007/0037553 A1    Feb. 15, 2007

(51) Int. Cl.
*H04Q 7/20* (2006.01)

(52) U.S. Cl. .......................... 370/310; 370/328; 370/329; 370/400; 370/349; 370/338; 455/426.1; 455/426.2; 455/410; 455/411; 455/422.1; 709/201; 709/202; 709/203; 709/218

(58) Field of Classification Search .................. 370/310, 370/328, 329, 349, 338, 330, 352, 355, 389, 370/395.52, 431, 432, 400, 219; 709/201, 709/202, 203, 218, 219, 229, 239, 238, 249; 455/410, 411, 422.1, 445, 403, 435.1, 435.2, 455/500, 517, 466, 435.3, 432.1, 433, 412, 455/412.1, 515, 426.1, 550.1, 414.1, 414.2, 455/414.3, 414.4; 380/247
See application file for complete search history.

(56) References Cited

U.S. PATENT DOCUMENTS

| | | | |
|---|---|---|---|
| 6,978,128 B1 * | 12/2005 | Raman et al. | 455/414.1 |
| 7,167,466 B2 * | 1/2007 | Chowdhury et al. | 370/349 |
| 2004/0095881 A1 * | 5/2004 | Borella et al. | 370/219 |
| 2004/0105420 A1 * | 6/2004 | Takeda et al. | 370/349 |
| 2006/0029014 A1 * | 2/2006 | Maturi | 370/328 |
| 2006/0078119 A1 * | 4/2006 | Jee et al. | 380/247 |
| 2006/0256762 A1 | 11/2006 | Patel et al. | |

OTHER PUBLICATIONS

M. Chiba et al., "Dynamic Authorization Extensions to Remote Authentication Dial-In User Service (RADIUS)", Internet-Draft, Aug. 2002.

3rd Generation Partnership Project 2 "3GPP2", IS-835 D, X.P0011-001-D, "cdma2000 Wireless IP Network Standard: Introduction", http://www.3gpp2.org/Public_html/Misc/v&vindex.cfm, Copyright 2003, no date included.

3rd Generation Partnership Project 2 "3GPP2", IS-835 D, X.P0011-002-D, "cdma2000 Wireless IP Network Standard: Simple IP and Mobile IP Services", http://www.3gpp2.org/Public_html/Misc/v&vindex.cfm, Copyright 2003, no date included.

(Continued)

*Primary Examiner*—Keith T Ferguson
(74) *Attorney, Agent, or Firm*—Weaver Austin Villeneuve & Sampson LLP

(57) ABSTRACT

Methods and apparatus are disclosed for reducing latency in a Mobile IP environment. These embodiments are particularly applicable in a 3GPP2 architecture using Mobile IPv6. Each of the features disclosed may be implemented separately or in combination with one another, and include replay protection, duplicate address detection, and updating state information at a PDSN in a system implementing route optimization.

40 Claims, 7 Drawing Sheets

OTHER PUBLICATIONS

3rd Generation Partnership Project 2 "3GPP2", IS-835 D, X.P0011-003-D, "cdma2000 Wireless IP Network Standard: Packet Data Mobility and Resource Management", http://www.3gpp2.org/Public_html/Misc/v&vindex.cfm, Copyright 2003, no date included.

3rd Generation Partnership Project 2 "3GPP2", IS-835 D, X.P0011-004-D, "cdma2000 Wireless IP Network Standard: Quality of Service and Header Reduction", http://www.3gpp2.org/Public_html/Misc/v&vindex.cfm, Copyright 2003, no date included.

3rd Generation Partnership Project 2 "3GPP2", IS-835 D, X.P0011-005-D, "cdma2000 Wireless IP Network Standard: Accounting Services and 3GPP2 RADIUS VSAs", http://www.3gpp2.org/Public_html/Misc/v&vindex.cfm, Copyright 2003, no date included.

3rd Generation Partnership Project 2 "3GPP2", IS-835 D, X.P0011-006-D, "cdma2000 Wireless IP Network Standard: PrePaid Packet Data Services", http://www.3gpp2.org/Public_html/Misc/v&vindex.cfm, Copyright 2003, no date included.

C. Perkins, "IP Mobility Support for IPv4," RFC 3344, Aug. 2002.

A. Patel et al., "Authentication Protocol for Mobile IPv6," Internet Draft, Feb. 2005.

C. Rigney et al., "Remote Authentication Dial In User Service (RADIUS)", RFC 2138, Apr. 1997 (65 pgs.).

C. Finseth et al., "An Access Control Protocol, Sometimes Called TACACS", RFC 1492, Jul. 1993 (21 pgs.).

D. Haskin et al., "IP Version 6 over PPP", RFC 2472, Dec. 1998 (14 pgs.).

S. Thomson et al., "IPv6 Stateless Address Autoconfiguration", RFC 2462, Dec. 1998 (24 pgs.).

S. Glass et al., "Registration Revocation in Mobile IPv4", RFC 3543, Aug. 2003 (31 pgs.).

D. Johnson et al., "Mobility Support in IPv6", RFC 3775, Jun. 2004 (165 pgs.).

* cited by examiner

METHODS AND APPARATUS FOR OPTIMIZATIONS IN 3GPP2 NETWORKS USING MOBILE IPV6

BACKGROUND OF THE INVENTION

The present invention relates to Mobile IP network technology. More specifically, this invention relates to mechanisms for performing optimizations in a 3GPP2 network in a Mobile IP environment.

Mobile IP is a protocol which allows laptop computers or other mobile computer units (referred to as "Mobile Nodes" herein) to roam between various sub-networks at various locations—while maintaining internet and/or WAN connectivity. Without Mobile IP or a related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 3344 of the Network Working Group, C. Perkins, Ed., "IP Mobility Support for IPv4," August 2002. Mobile IP is also described in the text "Mobile EP Unplugged" by J. Solomon, Prentice Hall. Both of these references are incorporated herein by reference in their entireties and for all purposes.

The Mobile IP process in a Mobile IPv4 environment are illustrated in FIG. 1. As shown there, a Mobile IP environment 2 includes the internet (or a WAN) 4 over which a Mobile Node 6 can communicate remotely via mediation by a Home Agent 8 and may also include a Foreign Agent 10. In the absence of a Foreign Agent in a Mobile IPv4 environment, or in a Mobile IPv6 environment in which a Foreign Agent is not implemented, the Mobile Node 6 can obtain a topologically correct IP address (i.e., collocated IP address) and register this IP address with the Home Agent. (In a Mobile IPv6 environment, this is accomplished via an Access Router rather than a Foreign Agent.) Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread Internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the Internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a Correspondent Node 18 from its new location. In Mobile IPv4, a message from the Mobile Node is then packetized and forwarded through Foreign Agent 10 over the internet 4 and to Correspondent Node 18 (as indicated by the dotted line "packet from MN") according to a standard internet protocol. If Correspondent Node 18 wishes to send a message to Mobile Node—whether in reply to a message from the Mobile Node or for any other reason—it addresses that message to the IP address of Mobile Node 6 on sub-network 12. The packets of that message are then forwarded over the Internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling." In the absence of a Foreign Agent, packets are tunneled directly to the Mobile Node 6 collocated care-of address.

In a Third Generation Parternship Project 2 (3GPP2) architecture, the Mobile Node uses Mobile-IP protocols to identify itself. An exemplary 3GPP2 architecture is described in IS-835 D, entitled "X.P0011-00x-D-cdma2000 Wireless IP Standard (6 DOCUMENTS: -001 thru -006)," which is incorporated herein by reference for all purposes. A Packet Data Serving Node (PDSN) serves as an access router in a 3GPP2 network. The PDSN contains Foreign Agent functionality in a Mobile IPv4 environment. When the Mobile Node attaches to the Foreign Agent, the Foreign Agent establishes a Mobile IP tunnel to the Home Agent and sends a registration request message to the Home Agent. In a Mobile IPv6 environment, the PDSN merely serves as a router enabling the Mobile Node to register with the Home Agent using a collocated care-of address.

The Home Agent accesses an authorization, authentication, and accounting (AAA) server to authenticate the Mobile Node. Various protocols such as the Remote Authentication Dial In User Service (RADIUS) and TACACS+ may be implemented to provide such a server. In addition, this protocol may similarly be implemented on each Home Agent that communicates with the server. RFC 2138 describes the RADIUS Protocol and is hereby incorporated by reference. Similarly, RFC 1492 describes TACACS and the Internet-Draft "The TACACS+ Protocol Version 1.78," available at http://www.ietf.org/internet-drafts/draft-grant-tacacs-02.txt, describes TACACS+. Both of these documents are incorporated herein by reference for all purposes.

The 3GPP2 architecture can provide mobility across different access networks (e.g., wireless). However, there is often significant latency in the application of Mobile IP in a 3GPP2 architecture.

In view of the above, it would be beneficial if the application of Mobile IP in a 3GPP2 architecture could be optimized.

SUMMARY OF THE INVENTION

Methods and apparatus for reducing latency in Mobile IP environments are disclosed. The disclosed embodiments are particularly applicable in a 3GPP2 architecture using Mobile IPv6. Each of these embodiments may be implemented separately or in combination with one another.

In accordance with one aspect of the invention, replay protection is provided. Specifically, a method of authenticating a Mobile Node in a Mobile IP environment implementing Mobile IPv6 includes receiving a binding update message by a Home Agent from the Mobile Node, where the binding update message includes an identifier generated by the Mobile Node. The identifier is obtained from the binding update message. The Mobile Node is then authenticated using the identifier obtained from the binding update message. When the Mobile Node is authenticated, the Home Agent sends a binding acknowledgement message indicating that the Mobile Node has been successfully registered with the Home Agent. When the Mobile Node is not authenticated, the Home Agent sends a binding acknowledgement indicating that the Mobile Node has not been successfully registered with the Home Agent and including an identifier generated by the Home Agent or a difference between the identifier generated by the Home Agent and the identifier generated by the Mobile Node. The Mobile Node may thereafter use this information to provide another identifier in a second binding update message sent to the Home Agent.

In accordance with one embodiment, the identifier generated by the Mobile Node is a time stamp. If the time stamp is out of sync with that of the Home Agent, the registration is unsuccessful. The Home Agent provides information to the Mobile Node, enabling the Mobile Node to synchronize its clock with that of the Home Agent. Subsequent registration attempts including a synchronized time stamp will thereafter be successful.

In accordance with another aspect of the invention, a method of clearing state information at a PDSN are disclosed. For instance, the Mobile Node or a Home Agent may send a revocation request message to the PDSN indicating that the Mobile Node is no longer visiting the PDSN. The PDSN may then update the state information accordingly. This is particularly useful in systems implementing route optimization, since data packets are not intercepted by the Home Agent.

In accordance with one embodiment, in a network device supporting Mobile IP, a method of notifying a PDSN that a Mobile Node is no longer visiting the PDSN includes ascertaining that the Mobile Node has roamed to a new location, identifying the PDSN that the Mobile Node is no longer visiting, and sending a revocation request message to the PDSN indicating that the Mobile Node is no longer visiting the PDSN, thereby enabling the PDSN to update state information associated with the Mobile Node.

In accordance with another embodiment, in a PDSN, a method of updating information associated with a Mobile Node, includes ascertaining that the Mobile Node has roamed to the PDSN, updating state information associated with the Mobile Node, receiving a revocation request message indicating that the Mobile Node is no longer visiting the PDSN, and updating the state information associated with the Mobile Node when the revocation request message is received.

In accordance with another embodiment, the state information that is updated includes accounting information. For instance a revocation request message may indicate that a Mobile IP session is completed. In this manner, a Mobile Node may be billed for a Mobile IP session even though data packets are not intercepted by the Home Agent.

In accordance with yet another embodiment, a session key is shared between the Mobile Node's home network and the visitor network associated with the PDSN. The revocation request message is composed using the session key shared between the Mobile Node's home network and the visitor network associated with the PDSN. This enables the revocation request message to be authenticated using the session key shared between the Mobile Node's home network and the visitor network associated with the PDSN.

In accordance with yet another aspect of the invention, methods and apparatus for registering a Mobile Node with its Home Agent are disclosed. The Mobile Node obtains a Home Agent address and a home prefix of the Home Agent address. It then appends an interface ID to the home prefix to generate a home address. The Mobile Node composes a binding update including the home address and the Home Agent address, and sends the binding update to the Home Agent.

In accordance with one embodiment, registration will be unsuccessful when a duplicate address has been detected by the Home Agent. When this occurs, the Mobile Node generates a new interface ID, appends the new interface ID to the home prefix to generate a new home address, composes a new binding update including the new home address, and sends the new binding update to the Home Agent. The Mobile Node repeats this process until registration is successful. In this manner, a Mobile Node may successfully register with its Home Agent without requiring manual configuration of its interface ID as a result of duplicate address detection.

In accordance with yet another aspect of the invention, a Home Agent address (e.g., virtual Home Agent address) is associated with a single Mobile Node's home address. In this manner, duplicate address detection in association with the Home Agent address is ensured to be successful. This Home Agent address may be a physical or virtual address.

In accordance with one embodiment, the Mobile Node obtains a Home Agent address, the Home Agent address being an IP address of the Home Agent and being associated with only the Mobile Node. The Mobile Node also obtains a home address associated with the Mobile Node. The Mobile Node composes a binding update including the home address and the Home Agent address, and sends the binding update to the Home Agent.

In accordance with another embodiment, the Home Agent obtains and stores a Home Agent address, the Home Agent address being an IP address associated with only the Mobile Node. When the Home Agent receives a binding update including the Home Agent address and a home address associated with the Mobile Node, it generates a mobility binding table entry for the Mobile Node, the mobility binding table entry associating the Mobile Node with its care-of address. The Home Agent composes a binding acknowledgement and sends the binding acknowledgement to the Mobile Node.

In accordance with another aspect of the invention, the invention pertains to a system operable to perform and/or initiate any of the disclosed methods in a Home Agent, PDSN, or Mobile Node. The system includes one or more processors and one or more memories. At least one of the memories and processors are adapted to provide at least some of the above described method operations. In yet a further embodiment, the invention pertains to a computer program product for performing the disclosed methods. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures, which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Methods and apparatus are disclosed for reducing latency in a Mobile IP environment. These embodiments are particularly applicable in a 3GPP2 architecture using Mobile IPv6. The features disclosed herein may be implemented separately or in combination with one another, and include replay protection, duplicate address detection, and updating state information at a PDSN in a system implementing route optimization. One example of a system implementing route optimization is disclosed in patent application Ser. No. 11/129,265, entitled "Methods and Apparatus for Implementing Mobile IPv6 Route Optimization Enhancements," naming Patel et al. as inventors, filed on May 12, 2005, which is incorporated herein by reference for all purposes.

Figure 1:
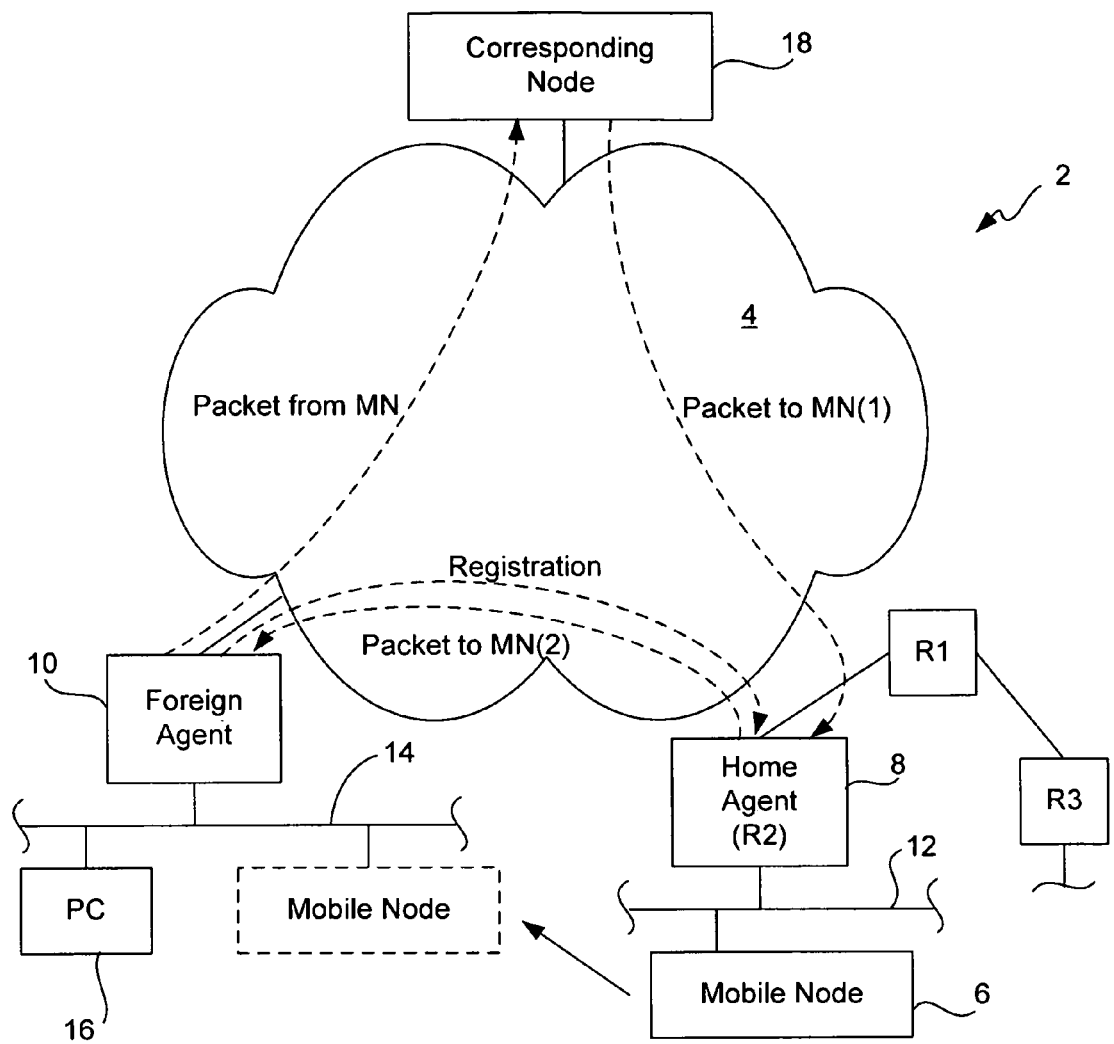
FIG. 1 is a diagram of a Mobile IP network segment and associated environment.
Figure 2:
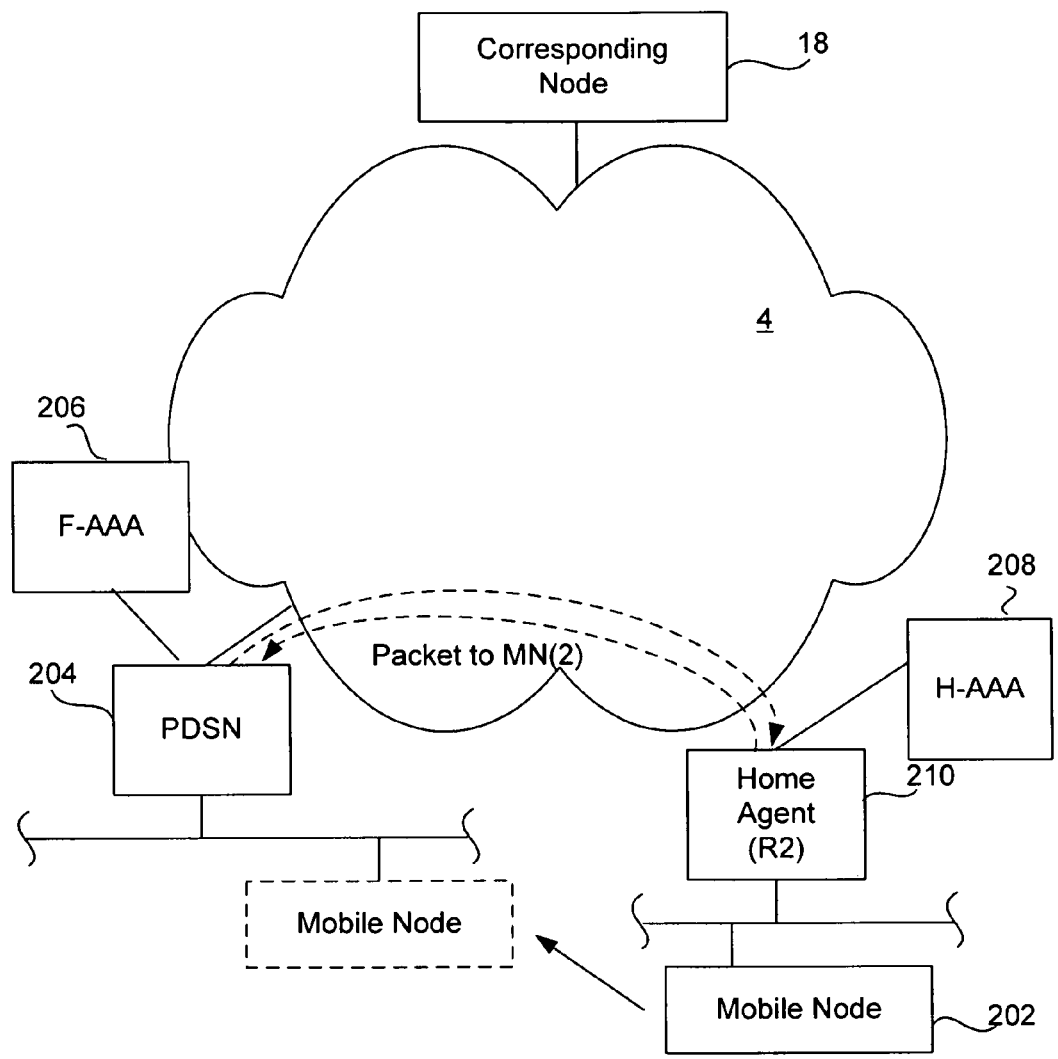
FIG. 2 is an exemplary 3GPP2 network in which embodiments of the invention may be implemented.

FIG. 2 is an exemplary 3GPP2 network in which embodiments of the invention may be implemented. Generally, a Mobile Node 202 sets up a PPP session with a PDSN 204. In order to establish the PPP session, the PDSN 204 sends a username, challenge, and challenge response associated with the Mobile Node 202 to a Foreign AAA server (FAAA server) 206 in the visited network. If the Foreign AAA server 206 does not have authentication information associated with the Mobile Node 204, the Foreign AAA server 206 may contact a Home AAA server (HAAA server) 208 in the Mobile Node's home network. In this manner, the PDSN obtains configuration data such as home prefix, Home Agent address, and/or authentication information from the FAAA via the HAAA.

Once the PPP session has been established, the Mobile Node 202 sends a Binding Update to Home Agent 210. The Home Agent may then authenticate the Mobile Node 202 by sending an authentication message (e.g., Access Request) to the Home AAA server 208. The Home AAA server 208 then sends an authentication reply (e.g., Access Reply) to the Home Agent 210 indicating whether the Mobile Node 202 has been authenticated.

One method for performing replay protection in a 3GPP2 network using Mobile IPv6 is described in IS-835 D, which defines a Mobile Node-AAA server (MN-AAA) authentication protocol and a HMAC-SHAI based authentication option in lieu of Ipsec. IS-835 D has been adopted by 3GPP2 as a requirement for authenticating Mobile Nodes in a 3GPP2 network. IS-835 D defines a key generation technique via the AAA infrastructure based on the MN-AAA shared secret key.

Per the IS-835 D specification, the AAA server provides for replay protection of the binding update message, as well as session key generation, based upon an identifier field in the binding update sent from the Mobile Node to the Home Agent. The binding update is authenticated using the MN-AAA authentication option of the binding update. Once the binding is created at the Home Agent, a subsequent binding update and binding acknowledgement exchange takes place between the Mobile Node and Home Agent, enabling the Mobile Node to be authenticated at the Home Agent using the session key.

In accordance with one embodiment, the second round trip binding update-binding acknowledgement exchange is eliminated. Specifically, the Mobile Node 202 is authenticated by the Home Agent 210 using an identifier received from the Mobile Node 202 rather than from the Home AAA server 208, where the identifier is generated using information provided by the Home Agent. For instance, the Mobile Node 202 may send a binding update message including this identifier to the Home Agent 210. The identifier may be generated by the Mobile Node 202 for purposes of its own authentication (or may be the identifier provided by the Home Agent). For instance, the identifier may be a time stamp generated by the Mobile Node 202. Specifically, the identifier may be provided in an option of the binding update message. The Home Agent 210 obtains the identifier and authenticates the Mobile Node 202 using that identifier. One method of authenticating the Mobile Node 202 using such an identifier will be described in further detail with reference to FIG. 3.

Figure 3:
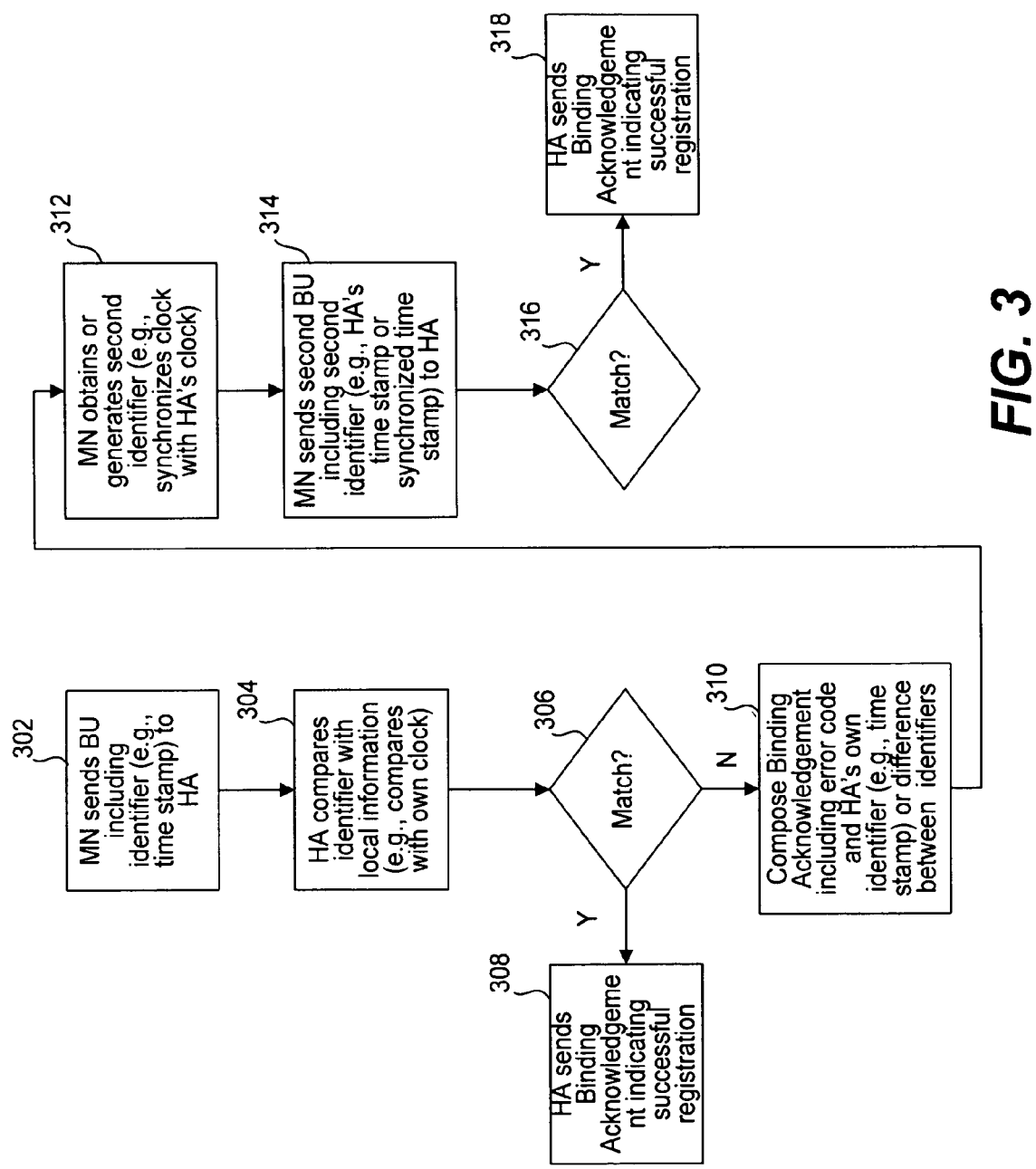
FIG. 3 is a process flow diagram illustrating a method of authenticating a Mobile Node in accordance with one embodiment of the invention.

FIG. 3 is a process flow diagram illustrating a method of authenticating a Mobile Node in accordance with one embodiment of the invention. As shown at 302, the Mobile Node sends a binding update including an identifier (e.g., time stamp) generated by the Mobile Node to the Home Agent. The Home Agent compares the identifier with local information, such as the Home Agent's clock, at 304. If the identifiers match 306, the Home Agent sends a binding acknowledgement message at 308 indicating that registration with the Home Agent is successful. However, if the identifiers do not match 306, the Home Agent sends a binding acknowledgement message at 310 indicating that registration is unsuccessful. In addition, the Home Agent provides its own identifier (e.g., time stamp) in the binding acknowledgement message (e.g., in an option to the binding acknowledgement message) or a difference between the two identifiers. This information will enable the Mobile Node to successfully register with the Home Agent (e.g., by synchronizing its clock with the Home Agent's clock).

In order to successfully register with the Home Agent, the Mobile Node obtains the Home Agent's identifier or difference between the two identifiers from the binding acknowledgement message and generates a second identifier from this information at 312. The Mobile Node sends a binding update including the second identifier to the Home Agent at 314. The second identifier may be the identifier generated by the Home Agent or the Mobile Node's synchronized time stamp that is synchronized with the Home Agent's clock (e.g., the sum of the difference between the two identifiers and the Mobile Node's current time stamp). This time, the second identifier should match the information local to the Home Agent such as an identifier generated by the Home Agent (e.g., the Home Agent's local clock) at 316. Thus, the Home Agent will send a binding acknowledgement message at 318 to the Mobile Node indicating that registration is now successful.

As described above, when a data packet is transmitted to a Mobile Node by a Correspondent Node, the data packet is typically sent to the Mobile Node's home address. As a result, the data packet is received by the Mobile Node's Home Agent and forwarded to the Mobile Node. Unfortunately, if the Mobile Node is in a remote location, the time it takes for packets to be transmitted via the Mobile Node's Home Agent can be costly.

In order to optimize packet routing, it is possible to notify the Correspondent Node of the Mobile Node's care-of address. This information enables the Correspondent Node to send packets directly to the Mobile Node without interception by the Mobile Node's Home Agent. While such a solution improves routing speed dramatically, accounting is typically performed by the Home Agent. Thus, it is difficult to generate bills for a Mobile Node's Mobile IP session when route optimization is implemented.

In order to enable accounting to be performed by a PDSN when route optimization is implemented, the PDSN should be notified of state changes of the Mobile Node. RFC 3543, entitled "Registration Revocation in Mobile IPv4," by S. Glass et al, August 2003, is incorporated herein by reference for all purposes. While RFC 3543 discloses a registration revocation feature that provides for resource clearing at the PDSN when the Mobile Node moves to a new PDSN in accordance with Mobile IPv4, this feature is dependent upon a trust relationship shared between the PDSN and the Home Agent. However, in Mobile IPv6, since the PDSN is a pass-through entity, there is no trust relationship between the Home Agent (or home network) and the PDSN (or visited network). As such, this feature cannot be applied in a Mobile IPv6 environment.

Figure 4:
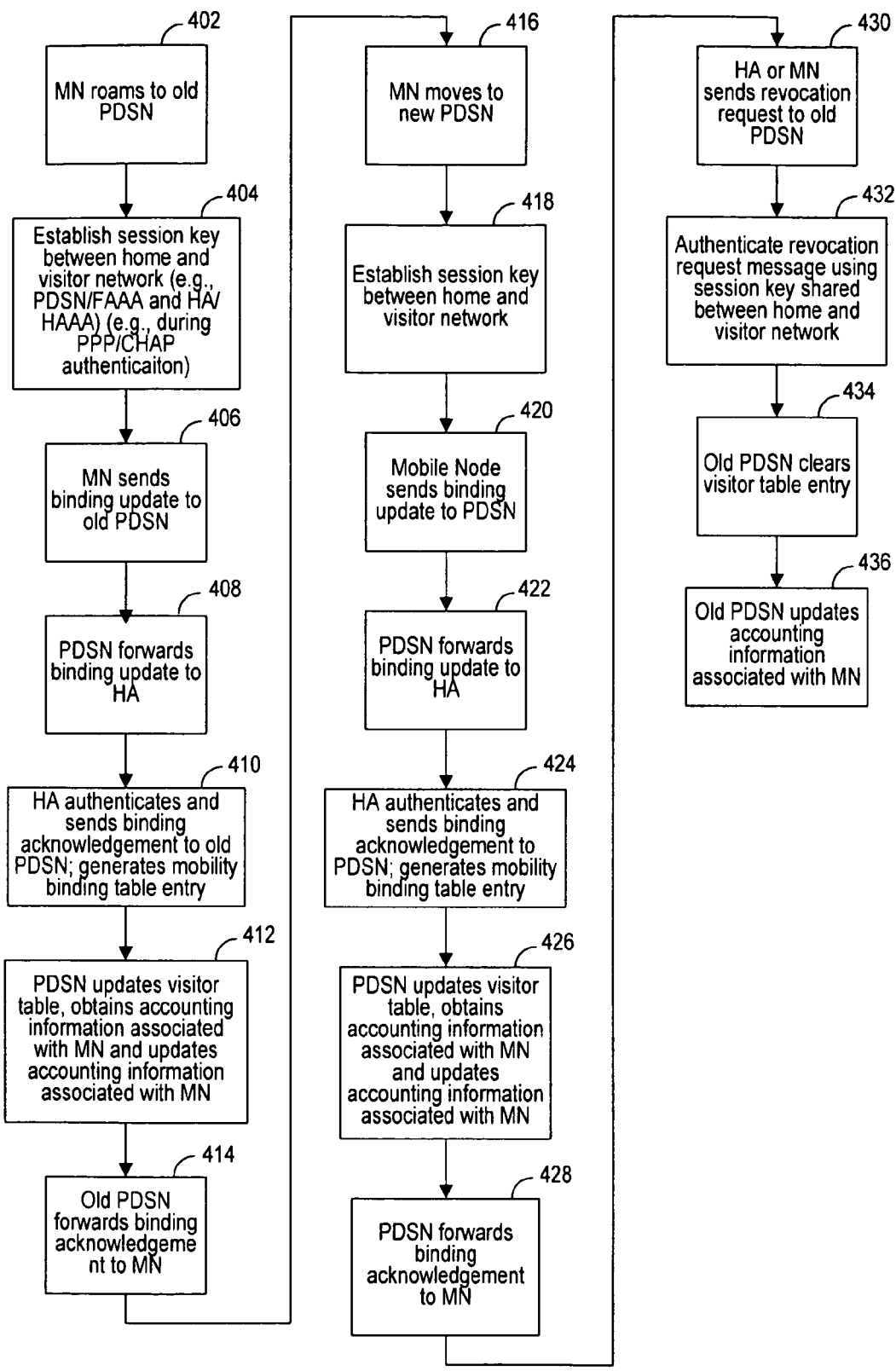
FIG. 4 is a process flow diagram illustrating a method of clearing the state at the PDSN when the Mobile Node roams to a different PDSN in accordance with one embodiment of the invention.

FIG. 4 is a process flow diagram illustrating a method of clearing the state at the PDSN when the Mobile Node roams to a different PDSN in accordance with one embodiment of the invention. When the Mobile Node roams to a first PDSN at 402, a session key is established between the Mobile Node's home network and the visited network at 404. For instance, the session key may be established between the first PDSN or the Foreign AAA server and the Home Agent or the Home AAA server. The session key may be generated, for example, after the Mobile Node roams to the first PDSN but before it registers with its Home Agent. Generation of the session key may be performed during PAP/CHAP authentication by the HAAA server via the FAAA server. The key may be provided to both the Mobile Node and PDSN, the PDSN and the Home Agent, or the PDSN and the HAAA server. For instance, a key may be generated by applying a hashing function (e.g., MD5) to a random number and the MN-HAAA key.

In order to register with its Home Agent, the Mobile Node sends a binding update to the Home Agent at 406 via the PDSN. The PDSN forwards the binding update to the Home Agent at 408. The Home Agent authenticates the Mobile Node (e.g., locally or via the Home AAA server), sends a binding acknowledgement to the PDSN, and updates its mobility binding table to associate the Mobile Node with the PDSN/Foreign Agent, as appropriate at 410.

Upon receipt of the binding acknowledgement indicating successful registration of the Mobile Node with the Home Agent, the PDSN updates its visitor table to associate the Mobile Node with its Home Agent at 412. The PDSN may also update accounting information associated with the Mobile Node, as appropriate. For instance, the PDSN may initiate accounting for the Mobile Node for that particular session. The PDSN then forwards the binding acknowledgement to the Mobile Node at 414.

When the Mobile Node moves to a new PDSN at 416, a session key is established between the home network (e.g., HA/HAAA) and the visitor network (e.g., PDSN/FAAA) at 418. The Mobile Node sends a binding update to the new PDSN at 420 to register with its Home Agent. The PDSN forwards the binding update to the Mobile Node's Home Agent at 422. The Home Agent authenticates the Mobile Node, sends a binding acknowledgement to the PDSN, and generates a mobility binding table entry at 424 associating the Mobile Node with the PDSN/Foreign Agent.

When the new PDSN receives the binding acknowledgement, it updates its visitor table to associate the Mobile Node with its Home Agent, and updates its accounting information associated with the Mobile Node at 426. For instance, the new PDSN may initiate accounting (e.g., billing) for the Mobile Node). The new PDSN forwards the binding acknowledgement to the Mobile Node at 428.

In order to notify the first PDSN that the Mobile Node is no longer visiting it (and to discontinue any accounting or billing, as well as to clear any state information, for that session), a revocation request message is sent to the first PDSN at 430. This may be performed, for example, by the Home Agent or the Mobile Node. The revocation request message is composed using the session key shared between the Mobile Node's home network and the visitor network associated with the PDSN.

When the first PDSN receives the revocation request message at 432, it authenticates the message using the session key shared between the Mobile Node's home network and the visitor network associated with the PDSN. Once the revocation request message has been authenticated, the first PDSN updates its state information by clearing its visitor table entry at 434. In addition, the first PDSN may also update its accounting information associated with the Mobile Node at 436. For instance, the first PDSN may discontinue accounting for the Mobile Node for that particular session. The first PDSN may then use this information to generate a bill for the service provided to the Mobile Node during that particular time period.

During Mobile IPv6 registration, a Mobile Node is often dynamically assigned a home address. In other instances, the Mobile Node generates a home address using its interface ID and sends a binding update including a home address to its Home Agent. Unfortunately, the interface ID does not ensure that a unique home address will be generated. In order to ensure that this home address is unique, the Home Agent performs duplicate address detection in accordance with RFC 2462 to determine whether the home address is a duplicate of another home address. If the home address is not unique, the Home Agent sends a binding acknowledgement with an error code 134 indicating that duplicate address detection has failed. According to current Mobile IP standards, the operator must manually configure a new interface ID, as required by RFC 3775, entitled "Mobility Support in IPv6," by D. Johnson et al, June 2004, which is incorporated herein by reference for all purposes. This manual configuration is far from ideal in a Mobile IP environment.

In accordance with one embodiment of the invention, the Mobile Node is capable of generating its own interface ID (e.g., via a random number generator or other suitable mechanism). Specifically, when duplicate address detection fails, the Mobile Node generates a new interface ID until registration with the Home Agent is successful. One method of performing Mobile IPv6 registration in this manner will be described below with reference to FIG. 5.

Figure 5:
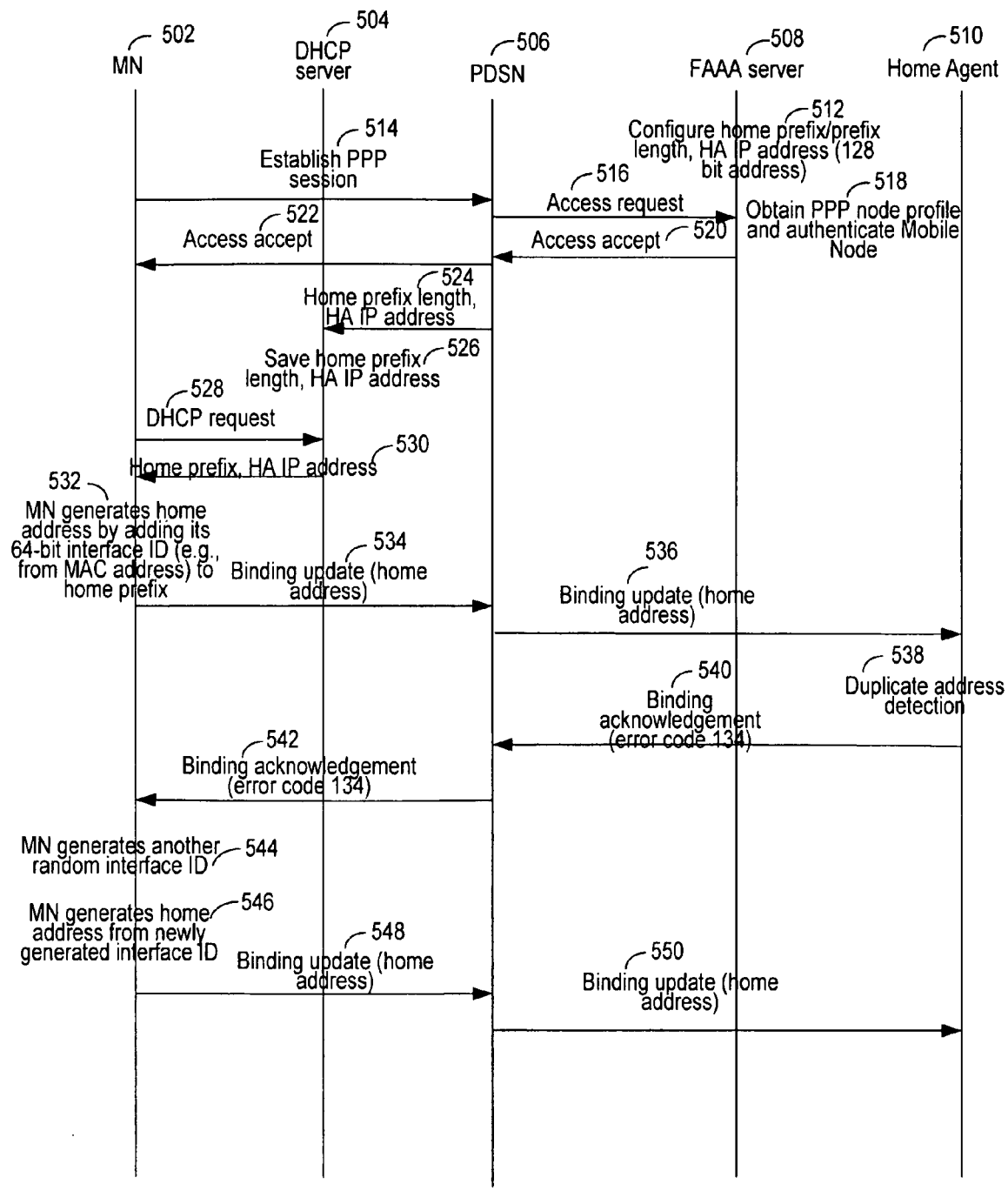
FIG. 5 is a process flow diagram illustrating a method of registering a Mobile Node during Mobile IPv6 registration in accordance with one embodiment of the invention.

FIG. 5 is a process flow diagram illustrating a method of registering a Mobile Node during Mobile Ipv6 registration in accordance with one embodiment of the invention. Steps performed by the Mobile Node, server (e.g., DHCP server), PDSN, Foreign AAA server, and Home Agent are represented by vertical lines 502, 504, 506, 508, and 510, respectively. As shown at 512, information supporting dynamic generation of a home address may be stored at the Foreign AAA server. For instance, this information may include an IP address of the Home Agent and/or a prefix length of the IP address of the Home Agent (or alternatively the prefix of the EP address). The prefix length may later be used by an entity to identify the prefix of the IP address. In addition, a AAA server typically stores information supporting authentication of Mobile Nodes, such as authentication keys.

When the Mobile Node establishes a PPP session at 514, the PDSN may contact the Foreign AAA server to authenticate the Mobile Node at 516 by sending an access request message (e.g., RADIUS access accept message) to the Foreign AAA server. In accordance with one embodiment, the PDSN will operate in accordance with RFC 2472, entitled "IP Version 6 over PPP," by D. Haskin et al, December 1998, which is incorporated herein by reference for all purposes. The Foreign AAA server authenticates the Mobile Node at 518 using information in the Mobile Node's PPP node profile, such as a Mobile-Foreign authentication key. Then Foreign AAA server then composes and sends an access accept message (e.g., RADIUS access accept message) to the PDSN at 520. In accordance with one embodiment, the access accept message includes information such as the IP address of the Home Agent, prefix length of the IP address and/or the home prefix itself. Of course, the home prefix of the IP address may be determined by the PDSN or Mobile Node using the prefix length. The PDSN then sends an accept message to the Mobile Node at 522.

The access accept message received by the Mobile Node may include the Home Agent address and home prefix length (or home prefix). Alternatively, the PDSN may send the Home Agent address and home prefix length (or home prefix) to a server such as a Dynamic Host Configuration Protocol (DHCP) server at 524. The DHCP server stores this information at 526. The Mobile Node sends a DHCP request at 528 to the DHCP server and receives a DHCP reply at 530 including the Home Agent address and home prefix length (or home prefix).

In accordance with one embodiment, the Mobile Node generates its own home address at 532. This may be accomplished by appending its 64-bit interface ID of its MAC address to the home prefix of the Home Agent. As indicated above, the Mobile Node may obtain the home prefix by obtaining the bits of the Home Agent address that correspond to the prefix length.

The Mobile Node generates and sends a binding update including the home address to the Home Agent address at 534. The PDSN forwards the binding update to the Home Agent at 536, which performs duplicate address detection at 538 in accordance with RFC 2462. The Home Agent sends a binding acknowledgement at 540, which is forwarded by the PDSN to the Mobile Node at 542.

If the binding acknowledgement indicates that a duplicate address has been detected (e.g., if the binding acknowledgement includes error code 134), the Mobile Node generates another interface ID at 544. For instance, the Mobile Node may generate an interface ID via a random number generator. The Mobile Node then generates a new home address from the newly generated interface ID at 546, as set forth above, in accordance with RFC 2462, entitled, "IPv6 Stateless Address Autoconfiguration," by S. Thomson, December 1998, which is incorporated herein by reference for all purposes. The Mobile Node sends a new binding update including this new home address at 548 to the Home Agent, which is forwarded by the PDSN at 550 to the Home Agent. The Mobile Node repeats this process, as appropriate, until registration with the Home Agent is successful.

Figure 6:
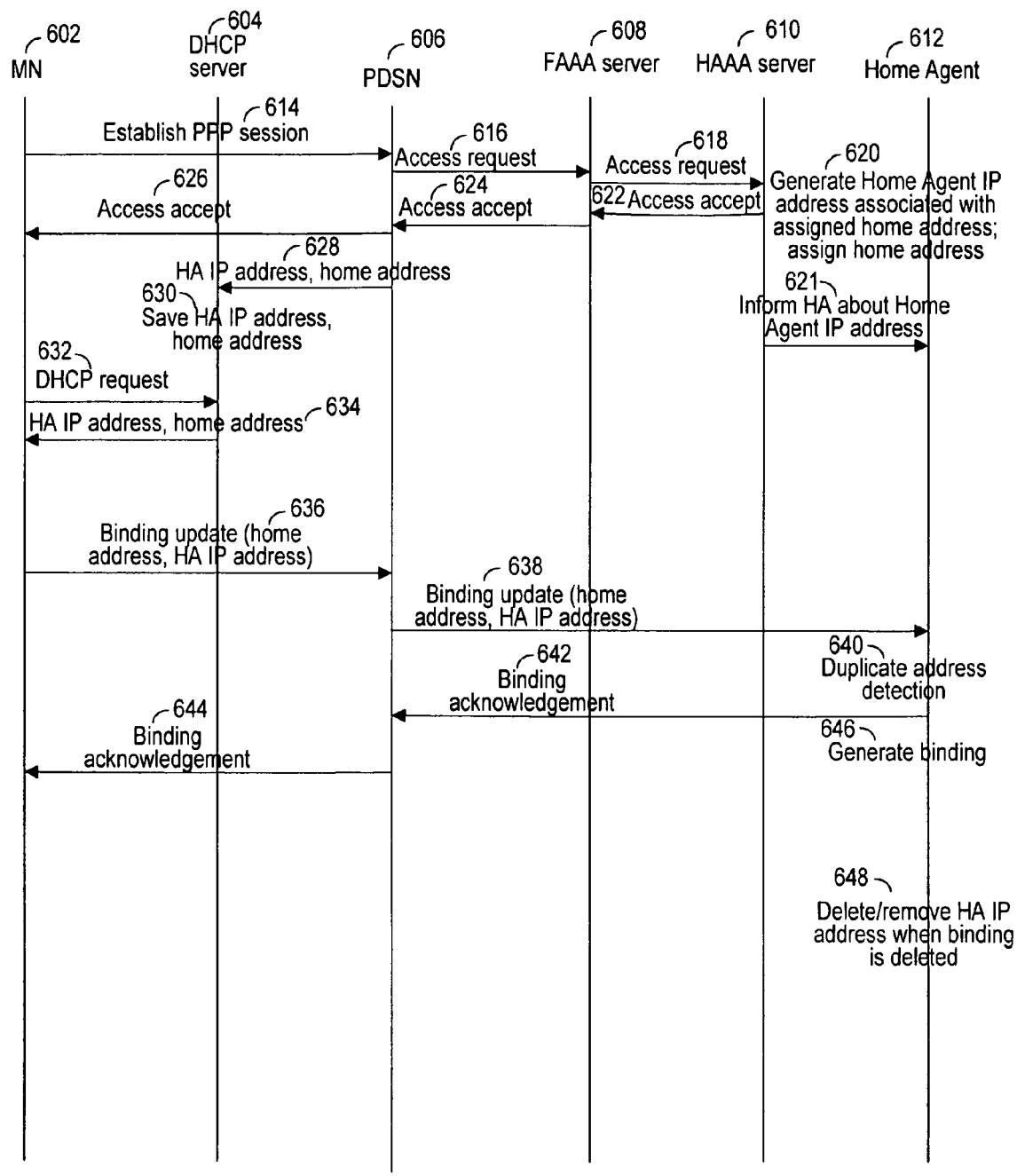
FIG. 6 is a process flow diagram illustrating a method of performing bootstrapping in accordance with one embodiment of the invention.

As set forth above with reference to FIG. 5, the Mobile Node may generate its own home address. In accordance with other embodiments, the Mobile Node is assigned a home address. FIG. 6 is a process flow diagram illustrating a method of performing bootstrapping in accordance with one embodiment of the invention. During bootstrapping, the Mobile Node's home address, Home Agent address, and/or security credentials may be provided to the Mobile Node's Home Agent, thereby enabling the Mobile Node to register with the Home Agent. Steps performed by a Mobile Node, DHCP server, PDSN, Foreign AAA server, Home AAA server, and Home Agent are represented by vertical lines 602, 604, 606, 608, 610, and 612, respectively. The Foreign AAA (F-AAA) server is a AAA server in the visited network, while the Home AAA (H-AAA) server is a AAA server in the home network. The Mobile Node contacts the PDSN to establish a PPP session at 614. In order to authenticate the Mobile Node, the PDSN may send an access request (e.g., RADIUS access request) to a Foreign AAA server at 616. If the Foreign AAA server does not have the information to authenticate the Mobile Node, the Foreign AAA server sends the access request message to the Home AAA server at 618.

In accordance with one embodiment, the Home AAA server generates a Home Agent IP address and generates a home address associated with this Home Agent IP address at 620. For instance, the Home Agent IP address may be associated with only the home address, thereby ensuring that duplicate address detection will always succeed. As one example, the U bit of the Home Agent IP address is set to 0 indicating that the Home Agent IP address is not based on a unique MAC address. This information is then returned to the Foreign AAA server at 622 (e.g., via an access accept message), which is forwarded to the PDSN at 624. This information (e.g., Home Agent IP address and home address) may be provided to the Mobile Node in the access accept message transmitted to it at 626. Alternatively, the PDSN may provide the Home Agent IP address and home address to the DHCP server at 628, which stores the information at 630. The Mobile Node may then send a DHCP request to the DHCP server at 632 to obtain the Home Agent EP address and home address at 634.

Once the Mobile Node has received the Home Agent address and its home address, it composes a binding update including the Home Agent address and home address and sends the binding update to the PDSN at 636. The PDSN forwards the binding update to the Home Agent at 638. In accordance with one embodiment, if this binding update is not received within a specific period of time (e.g., after receiving the Home Agent address at 621), the Home Agent address is deleted. The Home Agent performs duplicate address detection at 640. The Home Agent composes and sends a binding acknowledgement at 642, which is forwarded by the PDSN to the Mobile Node at 644. Since duplicate address detection is successful, the Home Agent generates a binding at 646 associating the Mobile Node's care-of address (e.g., PDSN) with its home address.

Since the Home Agent address is associated with only the home address of one Mobile Node, in accordance with one embodiment, the Home Agent address may be deleted when the binding associated with the Mobile Node is deleted. The binding may be deleted, for example, when the lifetime associated with the home address and/or Home Agent address has expired and/or a second binding update has not been received by the Home Agent from the Mobile Node to extend this lifetime.

The Home Agent IP address may be a virtual address. In other words, this address will not be advertised by the Home Agent. As a result, security is not compromised, and denial of service attacks may be minimized.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (e.g. Mobile Node, Home Agent) of this invention may be specially constructed for the required purposes, or may be a general-purpose programmable machine selectively activated or reconfigured by a computer program stored in memory. The processes presented herein are not inherently related to any particular router or other apparatus. In a preferred embodiment, any of the Home Agents of this invention may be specially configured routers such as specially configured router models 1700, 1800, 2500, 2600, 3200, 3600, 4000, 4500, 4700, 7200, and 7500 available from Cisco Systems, Inc. of San Jose, Calif. A general structure for some of these machines will appear from the description given below.

Generally, the registration and IP address optimization techniques of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid route optimization system of this invention is preferably implemented on a general-purpose programmable machine selectively activated or reconfigured by a computer program stored in memory. Such programmable machine may be a network device designed to handle network traffic. Such network devices typically have multiple network interfaces including frame relay, ISDN, and wireless interfaces, for example. Specific examples of such network devices include routers and switches. For example, the roaming systems of this invention may be specially configured routers such as specially configured router models 350, 1100, 1200, 1400, 1600, 2500, 2600, 3200, 3600, 4500, 4700, 7200, 7500, and 12000 available from Cisco Systems, Inc. of San Jose, Calif. A general architecture for some of these machines will appear from the description given below. In an alternative embodiment, the registration system may be implemented on a general-purpose network host machine such as a personal computer or workstation. Further, the invention may be at least partially implemented on a card (e.g., an interface card) for a network device or a general-purpose computing device.

Figure 7:
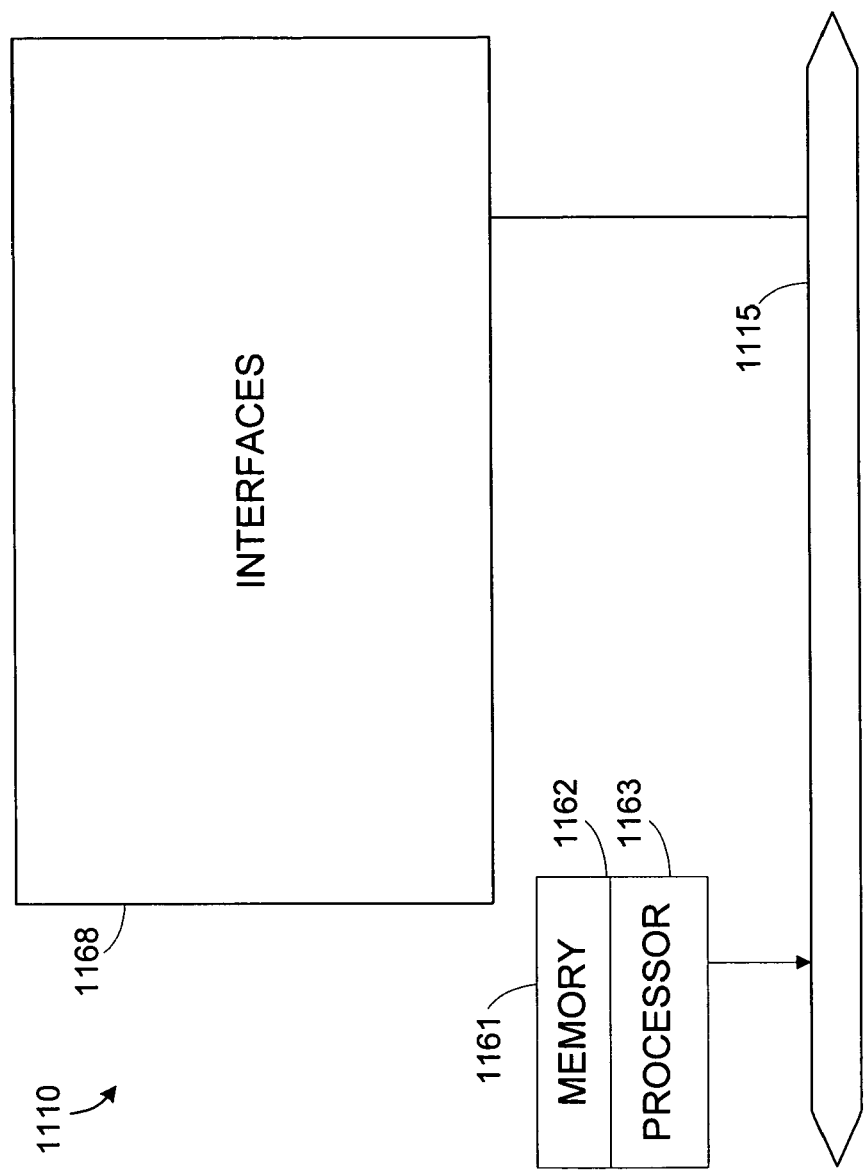
FIG. 7 is a diagrammatic representation of a router in which embodiments of the present invention may be implemented.

Referring now to FIG. 7, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 7 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 1161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Moreover, although the example described refers primarily to IPv6, the present invention may be used with other versions of IP. Therefore, the described embodiments should be taken as illustrative and not restrictive, and the invention should not be limited to the details given herein but should be defined by the following claims and their full scope of equivalents.

What is claimed is:

1. In a Mobile Node, a method of registering with a Home Agent, comprising:
    obtaining a Home Agent address, the Home Agent address being an IP address of the Home Agent;
    obtaining a home prefix of the Home Agent address;
    appending an interface ID to the home prefix to generate a home address;
    composing a binding update including the home address and the Home Agent address; and
    sending the binding update to the Home Agent.
2. The method as recited in claim 1, wherein the interface ID is at least a portion of a MAC address of the Mobile Node.

3. The method as recited in claim 1, further comprising:
    receiving a binding acknowledgement;
    determining whether the binding acknowledgement indicates that a duplicate address has been detected by the Home Agent; and
    when a duplicate address has been detected by the Home Agent, generating a new interface ID, appending the new interface ID to the home prefix to generate a new home address, composing a new binding update including the new home address, and sending the new binding update to the Home Agent.
4. The method as recited in claim 3, further comprising:
    repeating the steps of generating a new interface ID, appending the new interface ID to the home prefix, composing the new binding update, and sending the new binding update until registration with the Home Agent is successful.
5. The method as recited in claim 1, further comprising:
    sending a DHCP request to a DHCP server; and
    receiving a DHCP reply from the DHCP server, the DHCP reply including the Home Agent address and the home prefix.
6. In a Mobile Node, a method of registering with a Home Agent, comprising:
    obtaining a Home Agent address, the Home Agent address being an IP address of the Home Agent and being associated with only the Mobile Node such that the Home Agent address is associated with only a single Mobile Node;
    obtaining a home address associated with the Mobile Node;
    composing a binding update including the home address and the Home Agent address; and
    sending the binding update to the Home Agent.
7. The method as recited in claim 6, further comprising:
    sending a DHCP request to a DHCP server; and
    receiving a DHCP reply from the DHCP server, the DHCP reply including the Home Agent address and the home address.
8. The method as recited in claim 6, further comprising: generating the home address.
9. In a Home Agent, a method of supporting registration of a Mobile Node with the Home Agent, comprising:
    obtaining and storing a Home Agent address, the Home Agent address being an IP address associated with only the Mobile Node;
    receiving a binding update including the Home Agent address and a home address associated with the Mobile Node;
    generating a mobility binding table entry for the Mobile Node, the mobility binding table entry associating the Mobile Node with its care-of address;
    composing a binding acknowledgement; and
    sending the binding acknowledgement to the Mobile Node.
10. The method as recited in claim 9, further comprising:
    receiving the Home Agent address prior to receiving the binding update.
11. The method as recited in claim 10, further comprising: deleting the Home Agent address.
12. The method as recited in claim 10 wherein deleting the Home Agent address is performed when the binding update is not received within a specified period of time after the Home Agent address is received.
13. The method as recited in claim 9, further comprising:
    deleting the mobility binding table entry and deleting the Home Agent address.

14. The method as recited in claim 13, wherein deleting the mobility binding table entry and deleting the Home Agent address are performed when a lifetime associated with the Mobile Node has expired.

15. The method as recited in claim 13, wherein deleting the mobility binding table entry and deleting the Home Agent address are performed when a second binding update has not been received from the Mobile Node within a specified period of time.

16. The method as recited in claim 9, further comprising:
performing duplicate address detection for the home address associated with the Mobile Node;
wherein duplicate address detection includes determining whether the home address is a duplicate home address associated with the Home Agent address.

17. The method as recited in claim 16, wherein duplicate address detection never fails.

18. The method as recited in claim 9, wherein the Home Agent address is a virtual address.

19. In a Home AAA server, a method of generating a Home Agent IP address associated with a Home Agent, comprising:
receiving an access request;
generating a Home Agent IP address associated with only a single Mobile Node;
providing the generated Home Agent IP address to the Home Agent such that the Home Agent IP address is associated with only the single Mobile Node; and
sending an access reply.

20. The method as recited in claim 19, wherein a U bit of the Home Agent IP address is set to 0 indicating that the Home Agent IP address is not based on a unique MAC address.

21. A Mobile Node adapted for registering with a Home Agent, comprising:
a processor; and
a memory, at least one of the processor or the memory being adapted for:
obtaining a Home Agent address, the Home Agent address being an IP address of the Home Agent;
obtaining a home prefix of the Home Agent address;
appending an interface ID to the home prefix to generate a home address;
composing a binding update including the home address and the Home Agent address; and
sending the binding update to the Home Agent.

22. The Mobile Node as recited in claim 21, wherein the interface ID is at least a portion of a MAC address of the Mobile Node.

23. The Mobile Node as recited in claim 21, at least one of the processor or the memory being further adapted for:
receiving a binding acknowledgement;
determining whether the binding acknowledgement indicates that a duplicate address has been detected by the Home Agent; and
when a duplicate address has been detected by the Home Agent, generating a new interface ID, appending the new interface ID to the home prefix to generate a new home address, composing a new binding update including the new home address, and sending the new binding update to the Home Agent.

24. The Mobile Node as recited in claim 23, at least one of the processor or the memory being further adapted for:
repeating the steps of generating a new interface ID, appending the new interface ID to the home prefix, composing the new binding update, and sending the new binding update until registration with the Home Agent is successful.

25. The Mobile Node as recited in claim 21, at least one of the processor or the memory being further adapted for:
sending a DHCP request to a DHCP server; and
receiving a DHCP reply from the DHCP server, the DHCP reply including the Home Agent address and the home prefix.

26. A Mobile Node adapted for registering with a Home Agent, comprising:
a processor; and
a memory, at least one of the processor or the memory being adapted for:
obtaining a Home Agent address, the Home Agent address being an IP address of the Home Agent and being associated with only the Mobile Node such that the Home Agent address is associated with only a single Mobile Node;
obtaining a home address associated with the Mobile Node;
composing a binding update including the home address and the Home Agent address; and
sending the binding update to the Home Agent.

27. The Mobile Node as recited in claim 26, at least one of the processor or the memory being further adapted for:
sending a DHCP request to a DHCP server; and
receiving a DHCP reply from the DHCP server, the DHCP reply including the Home Agent address and the home address.

28. The Mobile Node as recited in claim 26, at least one of the processor or the memory being further adapted for:
generating the home address.

29. A Home Agent supporting registration of a Mobile Node with the Home Agent, comprising:
a processor; and
a memory, at least one of the processor or the memory being further adapted for:
obtaining and storing a Home Agent address, the Home Agent address being an IP address associated with only the Mobile Node;
receiving a binding update including the Home Agent address and a home address associated with the Mobile Node;
generating a mobility binding table entry for the Mobile Node, the mobility binding table entry associating the Mobile Node with its care-of address;
composing a binding acknowledgement; and
sending the binding acknowledgement to the Mobile Node.

30. The Home Agent as recited in claim 29, at least one of the processor or the memory being further adapted for:
receiving the Home Agent address prior to receiving the binding update.

31. The Home Agent as recited in claim 30, at least one of the processor or the memory being further adapted for:
deleting the Home Agent address.

32. The Home Agent as recited in claim 30, wherein deleting the Home Agent address is performed when the binding update is not received within a specified period of time after the Home Agent address is received.

33. The Home Agent as recited in claim 29, at least one of the processor or the memory being further adapted for:
deleting the mobility binding table entry and deleting the Home Agent address.

34. The Home Agent as recited in claim 33, wherein deleting the mobility binding table entry and deleting the Home Agent address are performed when a lifetime associated with the Mobile Node has expired.

35. The Home Agent as recited in claim 33, wherein deleting the mobility binding table entry and deleting the Home Agent address are performed when a second binding update has not been received from the Mobile Node within a specified period of time.

36. The Home Agent as recited in claim 29, at least one of the processor or the memory being further adapted for:
performing duplicate address detection for the home address associated with the Mobile Node;
wherein duplicate address detection includes determining whether the home address is a duplicate home address associated with the Home Agent address.

37. The Home Agent as recited in claim 36, wherein duplicate address detection never fails.

38. The Home Agent as recited in claim 29, wherein the Home Agent address is a virtual address.

39. A Home AAA server adapted for generating a Home Agent IP address associated with a Home Agent, comprising:

a processor; and
a memory, at least one of the processor or the memory being adapted for:
receiving an access request;
generating a Home Agent IP address associated with only a single Mobile Node;
providing the generated Home Agent IP address to the Home Agent; and
sending an access reply.

40. The Home AAA server as recited in claim 39, wherein a U bit of the Home Agent IP address is set to 0 indicating that the Home Agent IP address is not based on a unique MAC address.

* * * * *